United States Patent [19]

Wolf

[11] Patent Number: 4,582,629

[45] Date of Patent: Apr. 15, 1986

[54] USE OF MICROWAVE RADIATION IN SEPARATING EMULSIONS AND DISPERSIONS OF HYDROCARBONS AND WATER

[75] Inventor: Nicholas O. Wolf, Ponca City, Okla.

[73] Assignee: Conoco Inc., Ponca City, Okla.

[21] Appl. No.: 566,616

[22] Filed: Dec. 29, 1983

Related U.S. Application Data

[63] Continuation-in-part of Ser. No. 363,329, Mar. 29, 1982, abandoned.

[51] Int. Cl.⁴ .............................................. B01D 17/04
[52] U.S. Cl. .................................. 252/348; 210/708; 210/748; 252/331; 252/346
[58] Field of Search ....................... 252/331, 346, 348; 210/708, 748

[56] References Cited

U.S. PATENT DOCUMENTS 2,446,557  8/1948  Schutz et al. ....................... 252/346

OTHER PUBLICATIONS

Berkman et al.: "Emulsions and Foams", Reinhold Publ. Corp., New York, 1941, pp. 285-291.
Copson: "Microwave Heating", The Avi Publ. Co., Inc., Westport, Conn., 1962, pp. 371-373.

Primary Examiner—Richard D. Lovering
Attorney, Agent, or Firm—Stephen A. Littlefield

[57] ABSTRACT

Oil and water emulsions can be more rapidly separated when exposed to electromagnetic radiation in the range of from 1 to 300 millimeters, commonly called microwaves. The microwave treatment can be in conjunction with other separating and heating devices such as skimmers, gun barrel treaters, heater treaters, and the like.

12 Claims, 2 Drawing Figures

USE OF MICROWAVE RADIATION IN SEPARATING EMULSIONS AND DISPERSIONS OF HYDROCARBONS AND WATER

This application is a continuation-in-part of application Ser. No. 363,329, filed Mar. 29, 1982, and now abandoned.

The present invention relates to a method for enhancing the separation of oil and water dispersions and emulsions. More particularly, the present invention is concerned with enhancing separation of oil and water emulsions and dispersions by treating the same with microwave radiation, whether alone or in conjunction with more conventional separating devices.

In the petroleum industry, most of the crude oil produced is co-mingled with water and gas. It is therefore necessary to provide a means of sufficiently and economically separating the oil/water and gas for separate discharge. Usually the separated water is returned to a subterranean formation containing oil and the separated oil is conducted to a pipeline for ultimate transporation to a refinery and end use. Normally, the separated gas is vented if in small quantities or if in commercial quantities collected for distribution and sale.

Primary production of oil from subterranean oil bearing reservoirs is normally obtained by exploiting the natural drive energy of the reservoir in the form of water drive, gas cap drive, solution gas drive, and combinations thereof. Oil remaining in the reservoir after primary energy sources have been depleted can be partially recovered by secondary recovery methods. One of the most common secondary recovery methods is waterflooding. Using this method flooding water is injected into the reservoir through one or more injection wells traversing the oil-bearing reservoir. The water displaces the oil in the reservoir and moves it through the reservoir toward one or more production wells from which oil is produced.

With the rising value of petroleum products it becomes increasingly important that separator equipment utilized by the petroleum industry extract the maximum possible recovered petroleum products from water and oil emulsions and dispersions. To this end improved separating vessels have been made from time to time over the years. Initially, the separators were merely open vessels providing a quiet zone with the intention that the water settle out and be withdrawn from the bottom of the vessel and that the petroleum float on the water be withdrawn from the top of the vessel. While this system is satisfactory to a degree, it nevertheless results in some oil remaining in the form of an emulsion with the withdrawn water and in like manner water being entrapped with the oil withdrawn from the top of the vessel. Further, such gravitational settling procedures are slow and require vessels of such volume that to allow separation by gravitation alone becomes exceedingly expensive and the reduced rate of flow results in general overall inefficiency.

Representative but non-exhaustive examples of various types of apparatus previously used in the art are gun barrel treaters, heater treaters, and the like. An apparatus specifically designed for use in separating oil and water can be found in, for example, U.S. Pat. No. 4,257,895. The use of ultrasonics is known for breaking hydrocarbon/water emulsions as described in U.S. Pat. Nos. 2,257,997; 3,200,567; and 3,594,314. Other references disclose the application of microwave energy in the recovery of oil from oil wells and oil shale such as U.S. Pat. Nos. 3,104,711, 3,133,592; 3,170,519 and 4,180,718. Microwaves have also been used in settling of solids and sewage and sewage sludge by using microwave energy such as described in U.S. Pat. No. 3,523,076.

However, none of these microwave references deal with the separation of oil/water emulsions and dispersions nor the necessity for increasing or enhancing the rate of separation therefrom. It would therefore be of great benefit to provide a method for enhancing the separation of such oil and water emulsions and dispersions.

It has now been discovered in accordance with the present invention that hydrocarbon and water emulsions and dispersions can be separated and the separation can be enhanced by the application of microwave radiation in the range of from 1 millimeter to 30 centimeters for a time sufficient to separate the dispersion or emulsion to the extent desired. Normally the microwave radiation will be used only for a short period of time, and the emulsion or dispersion will be heated to separation temperature by conventional means.

Microwave radiation as used in this specification and claims is defined in the Van Nostrand Scientific Encyclopedia, 1958, as extending from 300,000 MHz to 1,000 MHz or 1 millimeter (mm) to 30 centimeters (cm) in wavelength. Microwave frequencies between 2000 and 3000 MHz are preferred.

In general the microwave treatment of the oil/water emulsions or dispersions is carried out for an effective length of time. However, the emulsion or dispersion is normally treated at a power level of from about 1 watt to about 500 watts per gallon of emulsion or dispersion. This treatment is not sufficient to raise the temperature of the emulsion to levels normally used for separation, but will greatly enhance the resultant separation once heating is completed by conventional means.

The microwave radiation can be used in any desired wattage, but normally the higher the wattage used to produce the microwave radiation, the more quickly the dispersion or emulsion can be separated. The power used will range from a level of from about 300 to about 50,000 watts. Normally, microwave projectors in the wattage range of from about 800 to about 1000 watts will be used. For continous treatment, a power level of from about 1 watt to about 500 watts per gallon of emulsion or dispersion will be used.

The microwave radiation of the present invention can be clearly distinguished from the ionizing radiation of the prior art. Ionizing radiation can be broken down into particulate and non-particulate radiation. Particulate radiation is generated from electronic accelerators such as residence transformers, linear transformers, insulated core transformers, and the like. Non-particulate ionizing radiation are sources which emit radiation in the range of about $10^{-3}$ angstroms to about 2000 angstroms. Suitable sources of this radiation are vacuum ultraviolet lamps such as xenon or krypton arcs and nuclear reactors. These radiations are completely distinguishable from the microwave radiations of the instant invention.

The temperature of the initial dispersion or emulsion will affect the amount of kilowatt power required to treat the dispersion or emulsion. Although the following is in part theoretical in nature and I do not wish to be bound thereby, it appears that microwave treating is a combination of two mechanisms. The first mechanism is heating as in a conventional system. In this such a mechanism the microwave has the advantage of efficiency over conventional gas fired units. The second mechanism is connected with the excitation of bound water molecules which then disrupt surfactant molecules present in the interfacial film. Microwave treatment disrupts the emulsion and allows for more rapid separation of the oil and water. The temperature dependance of the power used in the process is mainly involved in the heating end, since water content will directly affect the extent to which a given microwave voltage applied will raise the temperature of the dispersion. Thus the colder the initial fluid and the higher the water content, the more power required.

The instant invention is applicable to both oil external and water external systems. In the area of temperature dependence, the difference between these systems is only in the amount of water to be heated. As oil absorbs roughly 100 times less microwave radiation than does water, the higher the incidence of water in the dispersion or emulsion, the more power required. Likewise, the higher the incidence of water, the more dramatic is the improvement in separation in oil-external systems.

The instant invention is effective in oil external emulsions or dispersions containing more than 50% oil by weight based on the total weight of the emulsion or dispersion. Likewise, the system is effective in water external emulsions or dispersions containing from about 1% to about 50% oil by weight based on tht total weight of the emulsion or dispersion.

The present invention can be used in combination with conventional treatment vessels such as heat treaters, which are tanks modified to add heat and provide residence time in the system. Microwaves would either be used directly in the tank to generate heat and interfacial disruption, or located in a section of the flow line just ahead of the tank. Likewise, the instant invention can be used in washtanks or gun barrel treaters, either in the tank or in the pipeline leading into the tank.

In practice, separation of emulsions and dispersions is carried out at temperatures of from about 45° C. to about 115° C. (to flash free water) but temperatures from 50° C. to 65° C. are more common and are preferred. The use of microwaves to enhance separation as described in the present invention raises the temperature of the dispersion or emulsion as previously described, but the best use is treatment of such materials to a temperature below that used for separation, then further increasing the temperature to separation levels. Whether used to completely heat the emulsion or dispersion, or to enhance separation without supplying all heat by microwave radiation, use of microwaves greatly facilitates separation of hydrocarbon-water emulsions and dispersions.

In general, there is a dramatic reduction in viscosity of emulsion subjected to microwave radiation. This reduction increases as time of exposure increases. Emulsions are much more easily broken as viscosity decreases. The microwave effect appears much greater than for externally supplied heat only.

The invention is more concretely described with reference to the examples below, wherein all parts and percentages are by weight unless otherwise specified. The examples are provided to illustrate the present invention and not to limit it. Microwave testing was accomplished using an International standard commercial microwave oven.

EXAMPLE 1

An experiment was carried out to determine the effect of microwaves on breaking emulsions prepared using both non-ionic and cationic surfactants. Two water-in-oil emulsions were prepared with tap water and crude oil in a ratio of 3:7 and one weight percent surfactant. In the first case, TETRONIC (trademark of and sold by BASF Corp.) nonionic surfactant was used, in the second case a quaternary amine cationic surfactant was used. The emulsions were mixed in a blender prior to testing.

One hundred milliliters of each emulsion was poured into each of three glass bottles. One bottle was placed in a 60° C. (140° F.) bath as a blank. The remaining bottles were submitted to two 20 and two 30-second exposures in the microwave, which raised the samples to a temperature of 46° C. and 58° C. respectively; then placed in the bath along with the control to raise and maintain their temperature. The amount of oil, emulsion, and water present in each bottle was recorded after one hour. The results for each emulsion are shown in Table 1.

TABLE 1

|  | Blank | 2-20-Second Exposures | 2-30-Second Exposures |
|---|---|---|---|
| Nonionic Surfactant ||||
| Oil | 40% | 60% | 70% |
| Emulsion | 60% | 35% | 15% |
| Free Water | — | 5% | 15% |
| Cationic Surfactant ||||
| Oil | — | — | — |
| Emulsion | 100% | 93% | 90% |
| Free Water | — | 7% | 10% |

It is evident that the microwave did not have the same quantitative results, but it did improve breakout in all cases. This example clearly shows that microwaves benefited breakout time with a mechanism distinct from heating alone.

EXAMPLE 2

Microwave use enhances the effect of chemicals used to break oil/water emulsions. This effect will be seen when comparing use of microwaves and chemicals to chemical use alone, using the same procedure as described in Example 1.

An emulsion containing about 40% oil by volume which is especially difficult to break ("tight" emulsion) will release about 15% of its bound water after 30 minutes when treated with 1000 parts per million of emulsion breaking chemicals (deemulsifier, Nalco 4412, trademark of Nalco Chemical Co.) after heating to 60° C. The same sample, if treated with 30 seconds of microwave radiation (while containing 1000 ppm deemulsifier) then heated to 60° C. will release about 70% of the bound water in 30 minutes.

EXAMPLE 3

Figure 2:
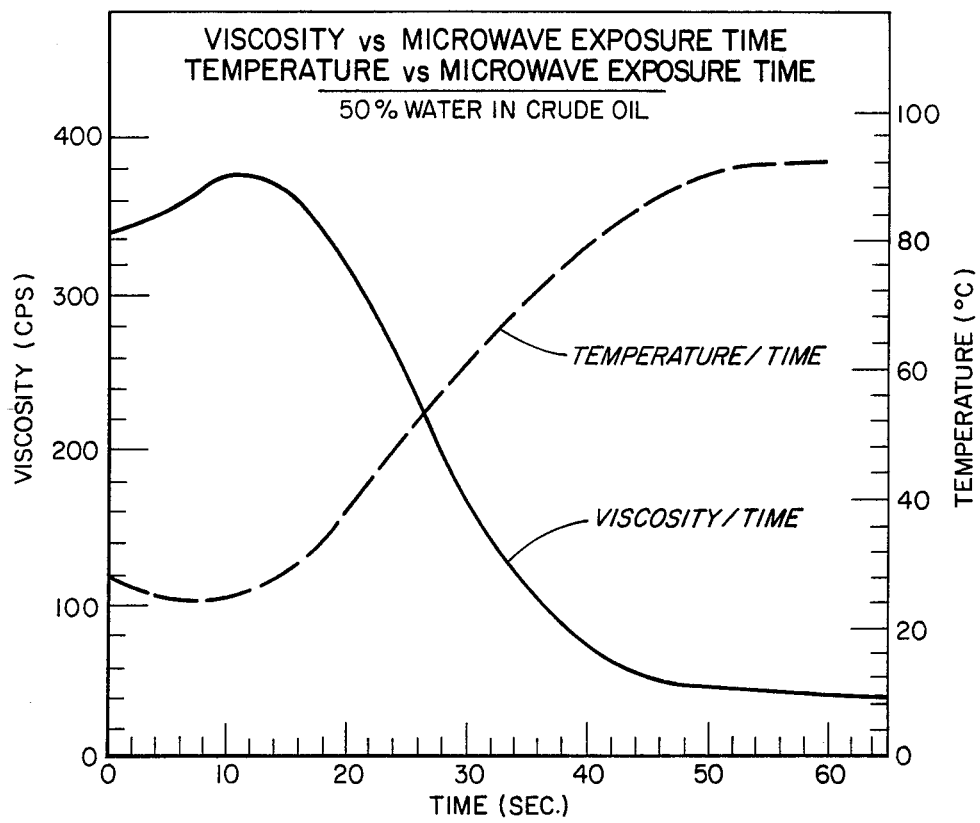
FIG. 2 is the same information presented for a 50% water in crude oil composition. The specific procedure used in generating the data used to form the figures is set forth in Example 3.
Figure 1:
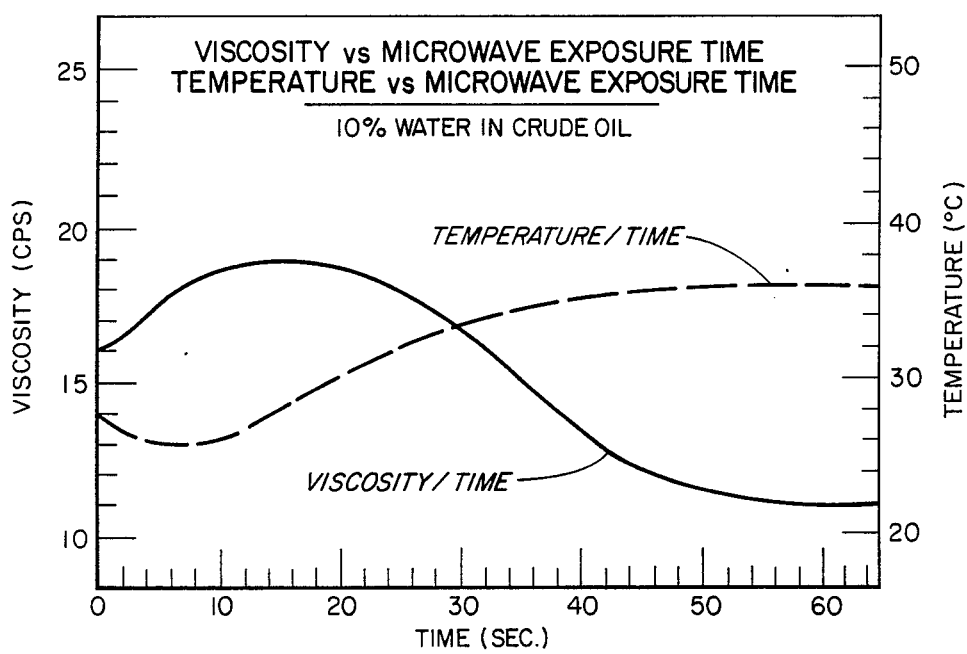
FIG. 1 is a graphic representation of viscosity vs microwave exposure time showing the effects of microwaving in 10% water in crude oil composition.

Viscosity changes as a result of microwave exposure was tested. Two dispersions were prepared, one containing 50% by volume water in crude oil, and a second containing 10% by volume water in crude oil. Each sample was blended at high speed for 5 minutes to produce a fresh "tight" emulsion. Portions of each sample were then subjected to a variety of temperatures and various lengths of microwave exposure time. Viscosity changes of the samples were determined using a Brookfield viscometer. FIGS. 1 and 2 graphically illustrate the changes in viscosity found. The change in both viscosity and temperature is proportionally much larger for the sample containing a larger quantity of water.

While certain embodiments and details have been shown for the purpose of illustrating this invention, it will be apparent to those skilled in this art that various changes and modifications may be made herein without departing from the spirit or scope of the invention.

I claim:

1. A method for enhancing the separation of hydrocarbon and water from an emulsion or dispersion thereof comprising the steps of subjecting said emulsion or dispersion to microwave radiation in the range of one millimeter to 30 centimeters and heating the microwave irradiated emulsion or dispersion to a separating temperature using conventional heating means.

2. A method as described in claim 1 when used at a power level of from about 300 to about 50,000 watts.

3. A method as described in claim 2 when used in oil external emulsions and dispersions.

4. A method as described in claim 3 wherein the oil external emulsion or dispersion contains from about 50% to greater than 99% oil by weight based on the total weight of the emulsion or dispersion.

5. A method as described in claim 4 wherein the emulsion or dispersion is treated at a power level of from about 1 watt to about 500 watts per gallon of emulsion or dispersion.

6. A method as described in claim 2 when used in water external emulsions and dispersions.

7. A method as described in claim 6 wherein the water external emulsion or dispersion contains from about 1% to about 50% oil by weight based on the total weight of the emulsion or dispersion.

8. A method as described in claim 7 wherein the emulsion or dispersion is treated at a power level of about 1 watt to about 500 watts per gallon of emulsion or dispersion in the presence of chemical deemulsifiers.

9. A method as described in claim 8 wherein chemical deemulsifiers are present at concentrations up to one percent by weight based on the weight of the dispersion or emulsion.

10. A method as described in claim 9 where the deemulsifier is selected from the group consisting of nonionic surfactants and cationic surfactants.

11. The method as described in claim 1 wherein said step of heating to a separating temperature comprises heating to a temperature of from about 45° C. to about 115° C.

12. A method for enhancing the separation of hydrocarbon and water from dispersion or emulsion thereof in the presence of chemical deemulsifiers comprising the steps of contacting the dispersion or emulsion and chemical deemulsifiers with microwave energy before heating the emulsion or dispersion to a separating temperature using conventional heating means.

* * * * *